D. M. TUTTLE.
COMPUTING DEVICE.
APPLICATION FILED MAR. 15, 1916.

1,280,591.

Patented Oct. 1, 1918.
2 SHEETS—SHEET 1.

WITNESSES:

INVENTOR
D. M. Tuttle
BY Howard P. Denison
ATTORNEY.

D. M. TUTTLE.
COMPUTING DEVICE.
APPLICATION FILED MAR. 15, 1916.
1,280,591.
Patented Oct. 1, 1918.
2 SHEETS—SHEET 2.
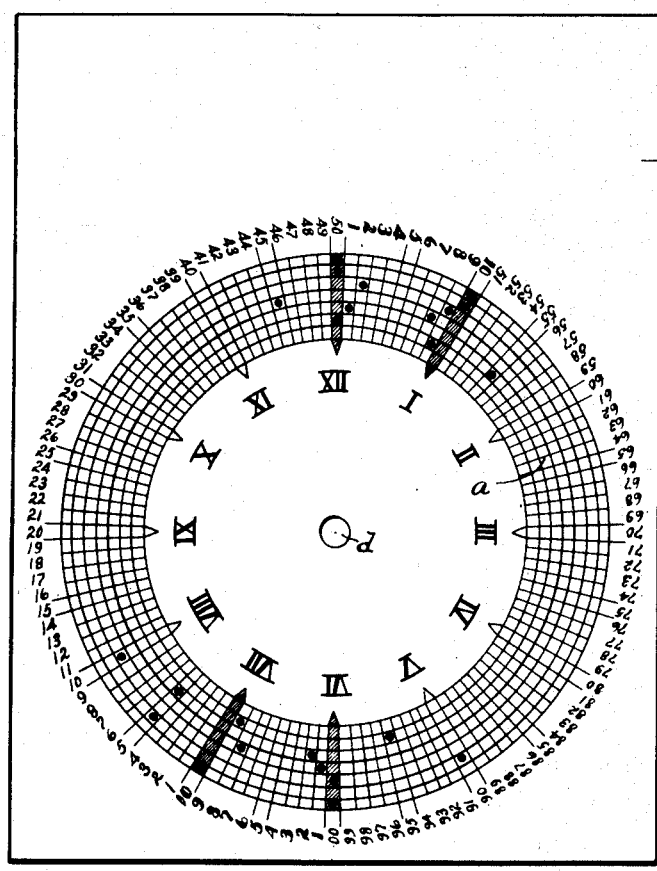
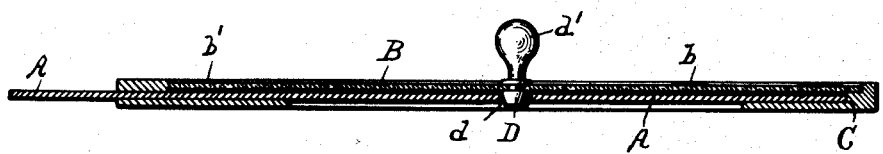

UNITED STATES PATENT OFFICE.

DANIEL M. TUTTLE, OF CANASTOTA, NEW YORK.

COMPUTING DEVICE.

1,280,591.  Specification of Letters Patent.  Patented Oct. 1, 1918.

Application filed March 15, 1916. Serial No. 84,333.

*To all whom it may concern:*

Be it known that I, DANIEL M. TUTTLE, a citizen of the United States of America, and resident of Canastota, in the county of Madison, in the State of New York, have invented new and useful Improvements in Computing Devices, of which the following, taken in connection with the accompanying drawings, is a full, clear, and exact description.

This invention relates to certain improvements in computing devices adapted to be used by timekeepers or accountants for determining at a glance the lapsed time or total wage or both to which a workman is entitled to be credited for continuous periods of work or for which a charge is to be made.

The main object is to render the operation of computing the lapsed or lost time and wages of a workman more accurate, reliable and expeditious than has heretofore been practised, and contemplates the use of a workman's time-card having printed or otherwise impressed thereon a scale of time-values progressively increasing by a constant factor from a definite point of beginning and adapted to receive impressions representing the times of beginning and ending of continuous work of an employee in line with the corresponding time-values on the scale, in combination with a similar wage-scale adjustable along the time-scale and bearing numerals progressively increasing in value from a definite point by a constant factor representing the wage per unit of time of the workman, whereby the total wage for any period between any two points on the time-scale will be shown on the wage-scale.

Another object is to associate with the time-scale a separate relatively movable time-scale similarly numbered and graduated so that by adjusting one of the scales along the other, the total time between any two points on the first-namel time-scale will be shown on the other time-scale, thus permitting the operator to determine at a glance the total lapsed time and the total wage due for such lapsed time between the time of beginning and ending of continuous work at a fixed price per unit of time.

A further object is to enable the several scales to be easily and quickly set in such relation that the total time of continuous work and total wage therefor may be indicated at a single setting.

A still further object is to enable the same device to be used in the computation of daily or weekly wage or lapsed time accounts.

Other objects and uses relating to specific features of the same device will be brought out in the following description.

In the drawings—

Fig. 2 is a face view of a workman's time card as used for daily records for seven days or a full week, showing the times of beginning and ending of continuous work of that particular workman for each day of the week.

Fig. 3 is a sectional view taken on line 3—3, Fig. 2.

Figure 1:
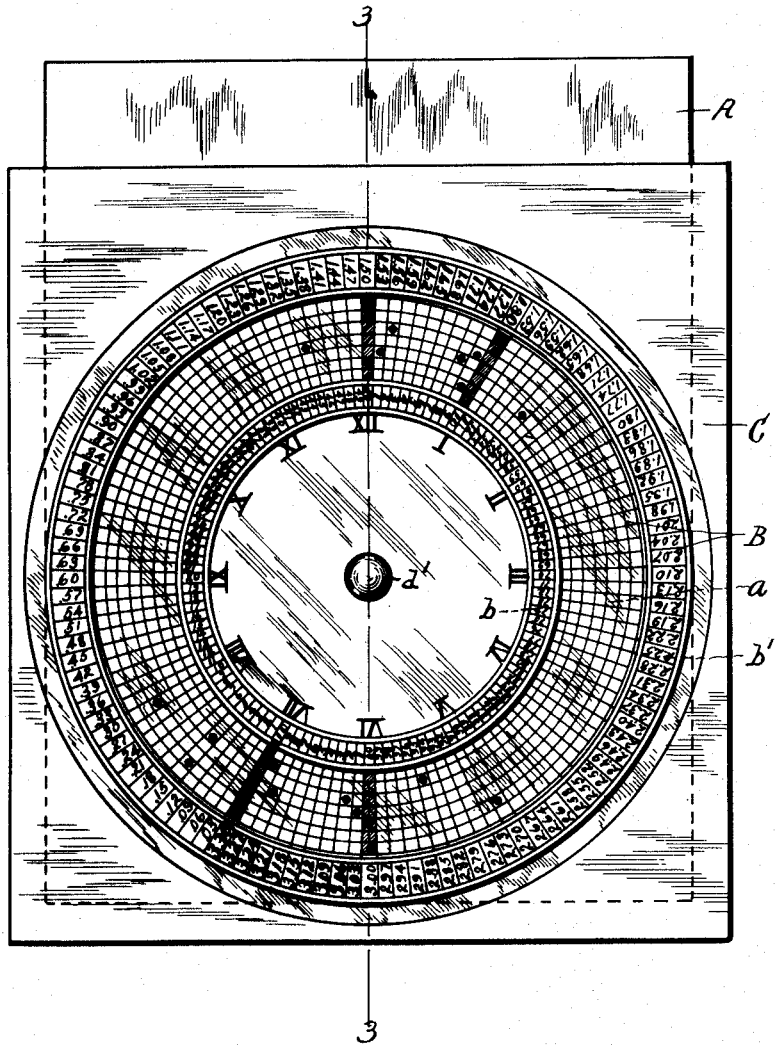
Figure 1 is a face view of the card guide with the card therein and the transparent disk bearing the time and wage scales for determining the total lapsed time and total wages.

As illustrated, this device comprises a time-card —A—, a computing card or disk —B— and means, as a guide frame —C—, or a centering pin —D—, for registering and retaining the disk and card in proper relation while adjusting either of them relatively to the other in the operation of determining the total wage or lapsed time between any two of the subdivisions of the time-scale on the card, as for example between the time of beginning and ending of continuous work.

Printed or otherwise impressed on the time-card —A— is a circular time-indicating dial or scale —a— divided radially into a series of, in this instance seven, concentric spaces representing sequentially the seven days of a week, each adapted to receive impressions representing the times of beginning and ending of continuous work in radial alinement with the corresponding time-value on the card, the outer space representing, in this instance, Monday.

The scale or dial is also divided longitudinally into a series of, in this instance twelve, equal spaces numbered clockwise from one to twelve, inclusive, and representing twelve hours, each hour of space being subdivided into ten equal spaces for convenience of computing on a decimal basis the lapsed time or wages due for a working day of ten hours, five hours in the forenoon from seven until twelve and five hours in the afternoon from one till six.

The subdivisions for the forenoon from seven until twelve are designated by numerals of progressively increasing value from 1 to 50, inclusive, while the subdivisions for the afternoon from one to six, inclusive, are designated by numerals of progressively increasing value from 51 to 99, inclusive, the hundredth space coinciding with the sixth hour and designated by a zero mark.

The subdivisions between the hours twelve and one and also between the hours of six and seven are designated by consecutive numerals 1 to 10, inclusive, to enable the operator to compute overtime if desired.

The impressions representing the times of beginning and ending, which for convenience may be termed the "Ins" and "Outs", may be made upon the card in proper places upon the dial by a suitable marking, stamping or punching machine not necessary to herein illustrate or describe, since the machine forms no part of my present invention, said impressions being indicated, in this instance, by black dots in the circular dial spaces and in radial alinement with the numerals representing the time at which the impressions were made.

The disk —B— preferably consists of a thin circular plate of transparent material, such as celluloid, placed upon or in close proximity to the dial face of the card —A— co-axial with said dial and rotatable relatively thereto, the centering pin —D— being adapted to fit in a central aperture, as —d—, in the card for the purpose of holding both parts coaxial during the movement of one relatively to the other, said centering pin being secured to the center of the disk —B— and provided with a handle —d'— by which the disk may be adjusted rotarily.

The disk —B— is of greater diameter than the dial —a— on the card so as to cover the concentric day-indicating spaces on said dial, the portion of the disk at the inner side of said spaces being provided with a circular row —b— of numerals corresponding in value and arrangement to those indicating the subdivisions of time on the dial, and preferably arranged in the same order, so that when it is in its starting or zero position each of its numerals will register with the subdivision designated by the same numeral.

It, therefore, follows that this circular row of numerals may be used as a scale for determining the lapsed time between any two points or subdivisions on the dial by simply adjusting the disk rotarily so that its zero mark will be registered with one of such points or subdivisions, whereupon the numeral registered with the other point or subdivision on the dial will indicate the total time between those two points.

The disk is also provided with another circular row —b'— of numerals at the outside of the dial corresponding in number to the number of subdivisions on said dial and progressively increasing in value from a definite point in radial alinement with the zero mark of the lapsed time scale by a constant value representing the wage per unit of time, in this instance .03, for each tenth of an hour, thus constituting a wage-scale for determining the total wage due for any period of time between any two subdivisions on the dial.

For example, assuming that the working day is ten hours beginning at 7 a. m. and ending at 12 m., and beginning again at 1 p. m. and ending at 6 p. m., and that the wage for this particular workman is thirty (30¢) cents per hour. Now if the workman begins and ends work on time, that is at 7 a. m. and 12 m. and 1 p. m. and 6 p. m., this fact will be apparent at a glance on the dial and will require no further calculation because the timekeeper will know at once that the workman is entitled to a full day and full wage.

On the other hand, the dots in the second annular space from the outer edge, representing Tuesday, show that the workman was five points late in beginning work and ending work on time at noon, and that he began work on time at 1 o'clock and ended at 5 p. m., and in order to obtain the lapsed time and wages due for this particular day, it is simply necessary to shift the disk rotarily until the zero marks or graduations are registered with the subdivision in which the dot representing the time of beginning is placed, whereupon the numeral of the lapsed time scale registering with the subdivision represented by 12 m. will indicate the total time of continuous work for the forenoon, while the numeral of the other scale registering with the same subdivision 12, will indicate the total wage due, in this instance, $1.35, for such time.

This amount is then set down and the disk is again adjusted to bring its radial zero line into registration with the subdivision in which the dot representing the time of beginning in the afternoon, or 1 o'clock, appears, whereupon the numeral of the inner lapsed time scale registering with the subdivision in which the next dot appears in the same day representing the time of ending work, in this instance 5 o'clock, will give the total continuous working time in the afternoon, while the numeral of the wage-scale registering with the same subdivision will give the total wage due for such time, and this total wage, as $1.20, which is also set down under the first-named wage-reading, and the two then added together to give the total wage for the day.

It is evident, however, that if the workman was only late in the morning, went out at noon on time, came in at 1 o'clock on time and went out at 6 o'clock, but one reading would be necessary, by simply setting the disk so that its zero graduation would register with the time of beginning, as indicated by the dot in any particular day.

In like manner, the period of time and wage due between any two points or subdivisions of time on the dial may be ascertained by simply setting the disk so that it indicates the total time of continuous work for the forenoon, while the numeral of the other scale registering with the same subdivisions 12 will indicate the total wage due, in this instance $1.35, for such time.

While the disk is still in this position, the numeral of the lapsed time-scale, in this instance 8.5, registering with the subdivision 5 on the time-card representing the time of ending of work of the day indicates the total time, eight and one-half hours, of continuous work for the full day, while the numeral of the wage-scale registering with the same subdivision will indicate the total wage, in this instance $2.55, for the day.

It is, therefore, evident that when an employee ends work on time or at 12 m. and begins work on time at 1 p. m., even though he began work late in the forenoon and ends work early in the afternoon, the total lapsed time and total wage due for the day may be obtained in a single reading, the same being also true if the workman should begin work late in the forenoon and end on time in the afternoon, or begin work on time in the morning and end work early in the afternoon.

It is also evident that if desired the lapsed time and wage due for the afternon may be obtained by simply registering the zero line of the disk with the time of beginning in the afternoon and then taking the reading of the lapsed time and wage due at the point of the disk registering with the subdivision on the time-card corresponding with the time of ending of work,—as for example, placing the zero line at 1 and noting the reading at 5 p. m., the time of ending of work, shows a total lapsed time of four (4) hours and a corresponding wage of $1.20, which may be added to the wage $1.35 for the forenoon, giving a total of $2.55 for the full day.

In like manner, the period of time and wage due between any two points or subdivisions of time on the dial may be ascertained by simply setting the disk so that its zero registration will register with one point, whereupon the numerals in the graduations on both scales registering with the other point or subdivision will show, respectively, the total lapsed time or total wage due for the intervening time.

If desired the subdivisions representing the standard times of beginning and ending of work, as for example 7 a. m.—12 m.—1 p. m. and 6 p. m. may be distinguished from the other subdivisions by shading or coloring and the subdivisions intervening between 6 and 7 and 12 and 1 may also be numbered in sequence from 1 and 9, inclusive, to enable the scales to be used in connection therewith for computing the lapsed time or wage due for overtime.

The guide-frame —C— consists of a chambered case open at one side to permit the insertion of the card —A— into the chamber, the walls of said chamber being so arranged as to register the card co-axially with the disk when inserted to the limit of its movement, the upper side of the case being provided with a circular opening in which the disk —B— is revoluble, thus permitting the disk and card to be removed and replaced by others in computing wages of different prices per unit of time.

The operation of my invention will now be readily understood upon reference to the foregoing description and the accompanying drawings, but it will be understood that the graduations and numbering of the dials and scales may be varied materially without departing from the spirit of my invention, and that a plurality of different wage-scales might be used on the same disk to coöperate with the same subdivisions of the dial in ascertaining the total wage for any lapsed period of time at different prices per unit of time.

It will also be evident that the same device may be used for obtaining the total lost time and the total wages which would be due therefor if desired.

What I claim is:—

1. In a workman's time and wage computing device, the combination of a series of three parallel scales having substantially equal spaces, those of two of the scales being designated by time values progressively increasing by a common factor from one of the spaces, the spaces of one of the two scales being adapted to receive marks in line with the time values representing the beginning and ending of continuous work of a workman, the spaces of the third scale being designated by wage-values progressively increasing by a common factor from one of their spaces, a support for one of the two scales and the third scale whereby each wage-value is permanently alined with the corresponding time-value on said support, and a separate support for the remaining scale, one of said supports being movable relatively to the other support in the direction of length of the scales to enable the marked space representing the beginning of work to be registered with the spaces representing the lowest values of the other two scales, whereby the values on the last-named scale corresponding to the spaces which register with the marked spaces representing the ending of said continuous work will show the total time of said continuous work and also the total wage due therefor at one and the same relative adjustment of the supports.

2. In a workman's time and wage computing device, the combination of a support having a time-scale and a wage-scale arranged in parallelism and in spaced relation, a separate support having a time-scale parallel with and registered with the space between the first-named scales and adapted to receive marks in line with the time values representing the beginning and ending of continuous work, one of said supports being adjustable relatively to the other in the direction of length of said scales to register the mark representing the beginning of work with the lowest values of both scales on the first-named support, whereby the values of said scales registering with the mark representing the ending of work will show the total time of said continuous work and the total wage therefor at one and the same adjustment of the supports.

3. In a workman's time and wage computing device, the combination of a support having a time-scale and a wage-scale arranged in parallelism and in spaced relation, a separate support having a time-scale parallel with and registered with the space between the first-named scales and adapted to receive marks in line with the time values representing the beginning and ending of continuous work, one of said supports being adjustable relatively to the other in the direction of length of said scales to register the mark representing the beginning of work with the lowest values of both scales on the first-named support whereby the values of said scales registering with the mark representing the ending of work will show the total time of said continuous work and the total wage therefor at one and the same adjustment of the supports, the first-named support having a transparent portion thereof overlying the time scale of the second-named support to enable said marks to be visible therethrough.

4. In a workman's time and wage computing device, the combination of a support having a time-scale and a wage-scale arranged in parallelism and in spaced relation, a separate support having a time-scale parallel with and registered with the space between the first-named scales and adapted to receive marks in line with the time values representing the beginning and ending of continuous work, one of said supports being adjustable relatively to the other in the direction of length of said scales to register the mark representing the beginning of work with the lowest values of both scales on the first-named support whereby the values of said scales registering with the mark representing the ending of work will show the total time of said continuous work and the total wage therefor at one and the same adjustment of the supports, all of said scales being circular and concentric with a common axis, the first-named support overlying the second-named support and having the portion thereof between its scales transparent and registering with the scale of the underlying support.

5. In a workman's time and wage computing device, the combination of a support having a time-scale and a wage-scale arranged in parallelism and in spaced relation, a separate support having a time-scale parallel with and registered with the space between the first-named scales and adapted to receive marks in line with the time values representing the beginning and ending of continuous work, one of said supports being adjustable relatively to the other in the direction of length of said scales to register the mark representing the beginning of work with the lowest values of both scales on the first-named support whereby the values of said scales registering with the mark representing the ending of work will show the total time of said continuous work and the total wage therefor at one and the same adjustment of the supports, all of said scales being circular and concentric with a common axis, the first-named support overlying the second-named support and having the portions thereof between its scales transparent and registering with the scale of the underlying support, and a holder for said scale supports having a guideway in which the second-named support is slidable radially to said axis to and from a position under the other support.

6. In a workman's time and wage computing device, the combination of a support having a time-scale and a wage-scale arranged in parallelism and in spaced relation, a separate support having a time-scale parallel with and registered with the space between the first-named scales and adapted to receive marks in line with the time values representing the beginning and ending of continuous work, one of said supports being adjustable relatively to the other in the direction of length of said scales to register the mark representing the beginning of work with the lowest values of both scales on the first-named support, whereby the values of said scales registering with the mark representing the ending of work will show the total time of said continuous work and the total wage therefor at one and the same adjustment of the supports, all of said scales being circular and concentric with a common axis, the first-named support overlying the second-named support and having the portion thereof between its scales transparent and registering with the scale of the underlying support, and a holder for said scale supports having a guideway in which the second-named support is slidable radially to said axis to and from a position under the other support, said holder having means for stopping the inward sliding movement of the slidable support when the axis of its scale is registered with that of the other scales.

7. In a workman's time and wage computing device, the combination of a support having a time-scale and a wage-scale arranged in parallelism and in spaced relation, a separate support having a time-scale parallel with and registered with the space between the first-named scales and adapted to receive marks in line with the time values representing the beginning and ending of continuous work, one of said supports being adjustable relatively to the other in the direction of length of said scales to register the mark representing the beginning of work with the lowest values of both scales on the first-named support, whereby the values of said scales registering with the mark representing the ending of work will show the total time of said continuous work and the total wage therefor at one and the same adjustment of the supports, one of the supports being circular and the other support substantially rectangular, and a holder having a circular chamber and a rectangular chamber, the circular support being rotatable in the circular chamber and the rectangular support being slidable in the rectangular chamber to and from a position beneath the circular support.

8. In a workman's time and wage computing device, the combination of a support having a time-scale and a wage-scale arranged in parallelism and in spaced relation, a separate support having a time-scale parallel with and registered with the space between the first-named scales and adapted to receive marks in line with the time values representing the beginning and ending of continuous work, one of said supports being adjustable relatively to the other in the direction of length of said scales to register the mark representing the beginning of work with the lowest values of both scales on the first-named support, whereby the values of said scales registering with the mark representing the ending of work will show the total time of said continuous work and the total wage therefor at one and the same adjustment of the supports, one of the supports being circular and the other support substantially rectangular, a holder having a circular chamber and a rectangular chamber, the circular support being rotatable in the circular chamber and the rectangular support being slidable in the rectangular chamber to and from a position beneath the circular support, and movable means for retaining the supports in such relation that their scales will be coaxial.

In witness whereof I have hereunto set my hand this 8th day of March, 1916.

DANIEL M. TUTTLE.

Witnesses:
H. E. CHASE,
ALICE M. CANNON.